D. W. LINDSEY.
VINE CUTTER FOR SWEET POTATOES.
APPLICATION FILED FEB. 12, 1910.
962,367.
Patented June 21, 1910.
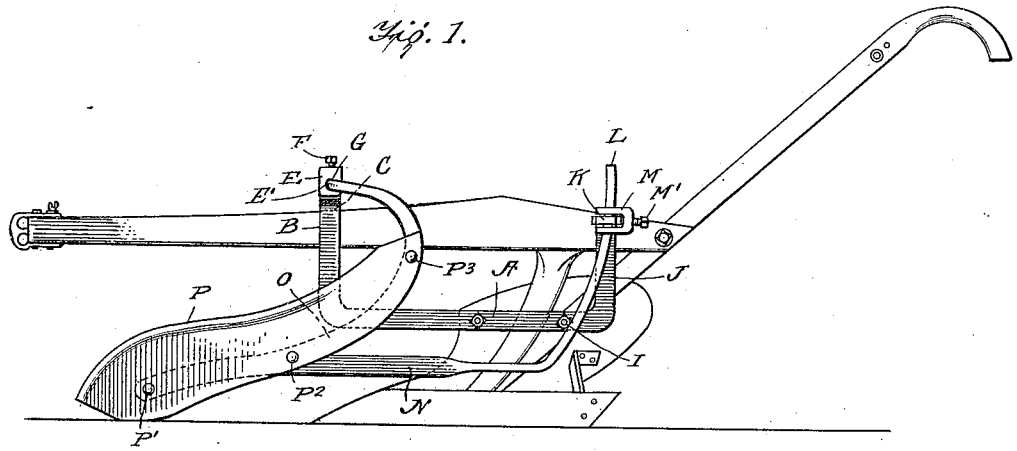
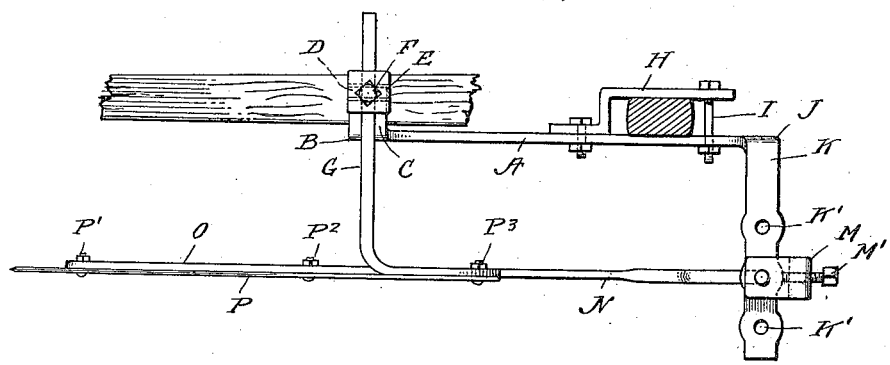
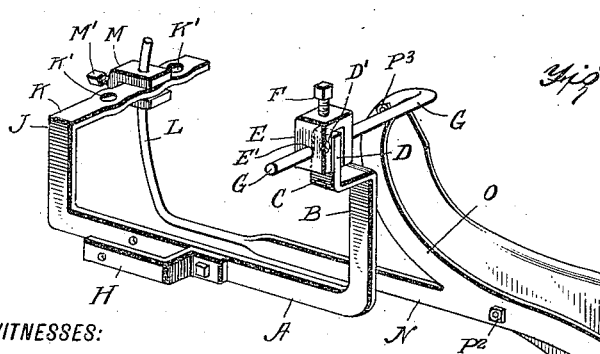
WITNESSES:
INVENTOR
DANIEL W. LINDSEY,
BY
ATTORNEYS

UNITED STATES PATENT OFFICE.

DANIEL W. LINDSEY, OF POPLAR BRANCH, NORTH CAROLINA.

VINE-CUTTER FOR SWEET POTATOES.

962,367.  Specification of Letters Patent.  Patented June 21, 1910.

Application filed February 12, 1910. Serial No. 543,460.

*To all whom it may concern:*

Be it known that I, DANIEL W. LINDSEY, a citizen of the United States, and a resident of Poplar Branch, in the county of Currituck and State of North Carolina, have invented certain new and useful Improvements in Vine-Cutters for Sweet Potatoes, of which the following is a specification.

This invention is an improvement in vine cutting attachments for plows, and while it may be found useful in cutting vines of various kinds, it is especially designed for cutting vines of sweet potatoes; and the invention consists in certain novel constructions and combinations of parts as will be hereinafter described and claimed.

In the drawing Figure 1 is a side view and Fig. 2 is a top plan view of my invention as in use, portions of the plow being broken away and others shown in section and Fig. 3 is a perspective view of the attachment removed from the plow, the view being taken from the side of the attachment which in use is next to the land side of the plow.

The purpose of the invention is to provide a simple means which can be readily applied to a plow and secured in place thereon and which will efficiently operate to cut the vines so the same can be readily cleared out of the way and thus facilitate the harvesting of the potatoes.

In carrying out the invention, I employ a frame which includes a main bar A having at its front end an up-turned arm B formed with an offset portion or shoulder at C adapted to rest upon a plow beam and having above said shoulder an upwardly projecting portion D provided with a lateral opening D' and adapted to receive a clamping block E having openings E' which coincide with the opening D' in the upwardly projecting portion D, the said clamping block being also provided with a screw F threaded in its top plate and bearing against the upper end of the upright portion D so as to clamp a lateral rod G of the blade carrier in the use of the invention as presently described. The main bar A is also provided with a clip H to embrace the plow standard and having a bolt I by which the standard may be clamped in order to secure the frame thereto as shown in Figs. 1 and 2 and various forms and sizes of clips may be provided in order to facilitate the connection of the main bar to various forms of standards, the clips in such cases being adapted to conform to the standards with which they are intended to be used. At its rear end the main bar has an up-turned portion J provided at its upper end with a lateral arm K having a series of openings K' to receive an upright rod L at the rear end of the blade carrier, a clamping block M, similar to the block E before described being provided and arranged as best shown in Figs. 2 and 3, to operate in clamping the rod L in any desired one of the holes K' when the screw M' is tightened as will be understood from Figs. 2 and 3 of the drawing. The blade carrier has a main bar N having an upturned portion O at its front end and the upright rod L at its rear end and having said upturned portion O inclining rearwardly and upwardly from the front end of the bar A, said front end of the bar N and the upwardly projecting portion O being adapted to receive and support the blade P and the lateral rod G of the blade carrier being connected with the upper end of the rod O and the said lateral rod G extending thence through the opening in the portion D of the main frame and being clamped as before described.

The blade P is secured to the blade carrier at the points P', P² and P³ and has its front end suitably formed to cut the vine and brought to a cutting edge along its front and upper side so the vines will be cut clear by the operation of the blade as the plow moves forward.

The blade carrier, it will be noticed, is connected adjustably with the main frame of the attachment so that it can be shifted laterally toward and away from the land side of the plow, the cutting attachment being arranged to operate on the land side of the plow as clearly shown in Figs. 1 and 2. In effecting this adjustment the upright L of the blade carrier be fitted into any suitable one of the holes K' and secured by the clamping devices M and M' provided for such purpose and by loosening the screw F, the lateral rod at the front end of the blade carrier can be shifted laterally within the openings provided for it in the clamp E and the upright portion D of the main frame and the blade carrier be then held in its desired position by tightening the screws F and M' as will be understood from the foregoing description. This feature of adjusting the blade carrier relatively to the plow is important as it enables me to set the blade to cut in the desired relation to the land side of the plow and I effect this adjustment in a simple manner by providing a main frame having means whereby it may be supported from a plow and a blade carrier which is connected with the main frame so it can be adjusted laterally relatively thereto thus enabling the adjustment of the blade carrier toward and from the main frame and consequently toward and from the plow to which the said main frame is secured. It will also be noticed that I secure the main frame to the plow in a simple manner so that by simply applying and removing the single bolt I, I am able to fasten the vine cutting attachment to and release it from the plow, the other point of connection being the lateral offset or shoulder C which rests upon the plow beam in advance of the connection at H and I with the standard.

By the described construction it will be noticed the blade carrier is pivoted on an approximately horizontal pivot by means of the lateral rod G to the main frame and is secured in rear of said pivot to the main frame with a capacity for vertical adjustment. This enables me to tilt the blade carrier to any suitable angle in order to secure the desired operation of the blade in the practical use of the invention and this may be found useful in adapting it to plows of various sizes as well as to various conditions of vines.

The invention is simple, easily applied for use, efficiently serves the purpose for which it is designed and is found in operation to result in a great saving of time and labor in cutting the vines so they can be readily removed to facilitate the harvesting of the potatoes.

I claim:

1. The vine cutter herein described consisting of a frame having a main bar provided at its front end with an upwardly projecting portion provided with a lateral offset forming a downwardly facing shoulder to rest upon a plow beam and having above said shoulder an upright portion provided with a transverse opening, the said main bar having at its rear end an upwardly projecting portion and a lateral arm extending therefrom and provided with a series of openings, a clamp block applied to said lateral arm and having openings to coincide with those therein, a clamp block applied to the upright portion at the front end of the main bar and having an opening to coincide with that in said upright portion, screws coöperating with said clamp blocks and a blade carrier having a lateral rod operating in the transverse opening of the said upright portion and the clamp block coöperating therewith and also having an upright rod operating in one of the openings of the lateral arm of the main frame and in the openings of the block coöperating therewith, and a clip on the main bar and adapted to embrace a plow standard, all substantially as and for the purpose set forth.

2. The combination in a vine cutter with a blade carrier, of a main frame having at its front portion a shoulder to rest upon a plow beam and having in rear of said shoulder means for connection with a plow standard and devices connecting the blade cutter adjustably with the main frame, substantially as set forth.

3. In a vine cutter, a main frame having at its front end a lateral opening and provided in rear thereof with a lateral arm, a blade cutter having a lateral rod operating in the lateral opening of the main frame, means for securing said rod in different lateral adjustments in said opening, an upright rod at the rear end of the blade carrier and means for securing said rod, in different adjustments, to the lateral arm of the main frame, substantially as set forth.

4. The combination of a plow, a blade carrier having a main bar, an upwardly projecting portion at the front end of the main bar, a laterally projecting rod extending from said upwardly projecting portion, an upright rod at the rear end of the main bar, a blade, and intermediate devices between said lateral rod and rear upright rod and the plow, substantially as set forth.

5. In a vine cutter, a blade carrier having a main bar, an upwardly projecting portion at the front end of the main bar, a laterally projecting rod extending from said upwardly projecting portion, and an upright rod at the rear end of the main bar, substantially as set forth.

6. The combination of a plow, a vine cutter having a blade carrier, a main frame having means to clamp the plow standard, and means in advance thereof to rest on the plow beam, and means for connecting the blade carrier with the main frame.

7. The combination in a vine cutter, of a main frame having at its front portion a shoulder to rest upon a plow beam, means on the main frame in rear of said shoulder for clamping a plow standard, a blade carrier, means for pivotally connecting the blade carrier with the main frame, and devices in rear of said means for securing the rear end of the blade carrier in different vertical adjustments, substantially as set forth.

8. A vine cutter comprising a main frame, means for securing the same in connection with a plow, a blade carrier provided at its front end with a lateral rod whereby it is pivotally connected with the main frame and adjustable laterally at its cutting point and also having an upwardly extending rod at the rear end of said blade carrier and means coöperating with said upwardly extending rod whereby the blade carrier may be vertically adjusted at its rear end at its connection with the main frame, substantially as set forth.

DANIEL W. LINDSEY.

Witnesses:
SOLON C. KEMON,
PERRY B. TURPIN.